United States Patent
Madishetty et al.

(10) Patent No.: US 12,342,412 B2
(45) Date of Patent: Jun. 24, 2025

(54) METHOD AND APPARATUS FOR COMMUNICATION IN COMMUNICATION SYSTEM SUPPORTING MULTI-TALKER MISSION CRITICAL PUSH-TO-TALK (MCPTT)

(71) Applicant: SAMSUNG ELECTRONICS CO., LTD., Suwon-si (KR)

(72) Inventors: Bhargav Madishetty, Bangalore (IN); Inturi Suhas Reddy, Bangalore (IN); Kiran Gurudev Kapale, Bangalore (IN); Siva Prasad Gundur, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 298 days.

(21) Appl. No.: 17/979,576

(22) Filed: Nov. 2, 2022

(65) Prior Publication Data
US 2023/0054874 A1    Feb. 23, 2023

Related U.S. Application Data

(63) Continuation of application No. PCT/KR2021/006289, filed on May 20, 2021.

(30) Foreign Application Priority Data

May 20, 2020  (IN) .............................. 202041021203
May 17, 2021  (IN) .............................. 202041021203

(51) Int. Cl.
*H04W 76/45*    (2018.01)
*H04L 65/1104*    (2022.01)
*H04L 65/4061*    (2022.01)

(52) U.S. Cl.
CPC ......... *H04W 76/45* (2018.02); *H04L 65/1104* (2022.05); *H04L 65/4061* (2013.01)

(58) Field of Classification Search
CPC . H04W 76/45; H04L 65/1104; H04L 65/4061
See application file for complete search history.

(56) References Cited

U.S. PATENT DOCUMENTS

| | | | |
|---|---|---|---|
| 11,310,290 B2* | 4/2022 | Pattan | ................ H04L 65/1069 |
| 2006/0035657 A1 | 2/2006 | Lim | |

(Continued)

FOREIGN PATENT DOCUMENTS

| | | |
|---|---|---|
| CN | 101052045 | 10/2007 |
| CN | 109565652 | 4/2019 |

(Continued)

OTHER PUBLICATIONS

Extended European Search Report and Written Opinion dated Jun. 30, 2023 issued by the European Patent Office for European Patent Application No. 21809789.7.

(Continued)

*Primary Examiner* — Raymond S Dean
(74) *Attorney, Agent, or Firm* — Nixon & Vanderhye, P.C.

(57) ABSTRACT

In an example embodiment of present disclosure, a method and apparatus to exchange an SSRC value between a client and a server for implicit floor requests are disclosed. In an embodiment, the exchange of the SSRC value between the client and the server for implicit floor requests is being done with Explicit Grant Support during a Multi-Talker MCPTT call where the SSRC sharing in FMTP media attribute of Session Description Protocol (SDP). In an embodiment, exchange of the SSRC value between the client and the server for implicit floor requests is being done with Implicit Grant Support during a Multi-Talker MCPTT call where the (Continued)

SSRC sharing in FMTP media attribute of SDP. In an embodiment, exchange of the SSRC value between the client and the server for implicit floor requests is being done with Implicit/Explicit Grant Support during a Multi-Talker MCPTT call where the SSRC sharing in SSRC and FMTP media attribute of SDP.

20 Claims, 6 Drawing Sheets

(56) References Cited

U.S. PATENT DOCUMENTS

| | | | | |
|---|---|---|---|---|
| 2013/0185451 | A1* | 7/2013 | Gelter | H04L 47/74 709/231 |
| 2013/0246632 | A1* | 9/2013 | Ginde | H04L 65/1104 709/227 |
| 2014/0106808 | A1 | 4/2014 | Agulnik et al. | |
| 2016/0295496 | A1 | 10/2016 | Atarius et al. | |
| 2017/0237600 | A1 | 8/2017 | Patel et al. | |
| 2017/0257751 | A1* | 9/2017 | Atarius | H04W 8/005 |
| 2017/0289776 | A1 | 10/2017 | Kim et al. | |
| 2018/0131734 | A1 | 5/2018 | Ko et al. | |
| 2018/0132072 | A1 | 5/2018 | Hyun et al. | |
| 2018/0242120 | A1 | 8/2018 | Baek et al. | |
| 2018/0279321 | A1* | 9/2018 | Hori | H04W 4/90 |
| 2020/0139961 | A1 | 5/2020 | Atarius et al. | |
| 2021/0297748 | A1* | 9/2021 | Gupta | H04N 21/43637 |
| 2021/0345447 | A1 | 11/2021 | Patten et al. | |

FOREIGN PATENT DOCUMENTS

| | | |
|---|---|---|
| IN | 7042/CHE/2015 | 11/2017 |
| IN | 2018-41007556 | 8/2019 |
| WO | 2017/057962 | 4/2017 |
| WO | 2020/085535 | 4/2020 |

OTHER PUBLICATIONS

3GPP TSG-RAN, "Update of MCPTT TC 6.2.1 On-network Private call", Meeting Notes, Meeting #78, Feb. 26, 2018, 18 pages.
3GPP TSG-CT, "SSRC handling for implicit floor request case", Meeting Notes, Meeting #124, Jun. 2, 2020, 3 pages.
International Search Report dated Aug. 26, 2021, for PCT/KR2021/006289, 3 pp.
Written Opinion of the ISA dated Aug. 26, 2021, for PCT/KR2021/006289, 5 pp.
Indian Office Action dated Jul. 15, 2022, for IN 202041021203, 5 pp.
Change Request, 3GPP TSG-CT WG1 Meeting #124-e, C1-203926, Electronic meeting, Jun. 2-10, 2020, SSRC handling for implicit floor request case, 5 pp.
3GPP TS 24.380 V16.4.0, Mission Critical Push To Talk (MCPTT) media plane control, Protocol specification, Dec. 2019, 274 pp.
3GPP TS 24.379 V16.4.0, Mission Critical Push To Talk (MCPTT) media call control, Protocol specification, Mar. 2020, 607 pp.
C1-193101, Harris Corporation, Firstnet, 3GPP TSG-CT WG1 Meeting #117, Reno, NV, May 13-17, 2019, Basic Floor Control, 31 pp.
Chinese Office Action issued May 31, 2024 in corresponding Chinese Patent Application No. 202180036423.7.
Chinese Decision on Grant issued Nov. 15, 2024 in corresponding Chinese Patent Application No. 202180036423.7.
3GPP TSG-CT, "Alignments and correctons for parameters, timers and counters", Meeting Notes, Meeting #96, Feb. 15-19, 2016, 121 pages.
Extended European Search Report dated May 9, 2025 for EP Application No. 25157356.4.

* cited by examiner

METHOD AND APPARATUS FOR COMMUNICATION IN COMMUNICATION SYSTEM SUPPORTING MULTI-TALKER MISSION CRITICAL PUSH-TO-TALK (MCPTT)

CROSS-REFERENCE TO RELATED APPLICATIONS

This application is a continuation of International Application No. PCT/KR2021/006289 designating the United States, filed on May 20, 2021, in the Korean Intellectual Property Receiving Office and claiming priority to Indian Provisional Patent Application No. 202041021203, filed on May 20, 2020, in the Indian Patent Office, and to Indian Complete Patent Application No. 202041021203, filed on May 17, 2021, in the Indian Patent Office, the disclosures of all of which are incorporated by reference herein in their entireties.

BACKGROUND

Field

The present disclosure relates to a method and apparatus for communication between a client and a server in a communication system supporting multi-talker mission critical push-to-talk (MCPTT).

Description of Related Art

In a Multi-Talker MCPTT call, when all group members are silent, a group member can press the Push-To-Talk (PTT) button, which is indicative of a request for permission to talk. A floor participant entity of said group member reflects this request to the floor control server by sending a Floor Request message. If the floor control server decides to permit, it informs this permission by sending a Floor Granted message to the requesting group member. The floor control server informs the initiation of the talk to the other group members by sending a Floor Taken message.

Further, in case of Multi-talker MCPTT calls, multiple Real Time Protocol (RTP) streams are identified through synchronization source (SSRC) value in the floor messages. The SSRC identifier uniquely identifies the floor participant within a session of a Multi-talker MCPTT call. The SSRC value is generated by the floor requester and sent in a Floor REQUEST message.

The original INVITE request or Session Initiation Protocol (SIP) REFER request to establish an MCPTT chat group call or to rejoin an ongoing MCPTT call is not handled as an implicit floor control request message by the floor control server, unless explicitly stated in the INVITE request or in the SIP REFER request. The MCPTT client needs to include various attributes when a SIP request shall be interpreted as an implicit floor request.

In case of implicit floor request method, the floor request is referred in INVITE itself and there is no explicit Floor REQUEST message from client. There is no mechanism defined in 3rd Generation Partnership Project (3GPP) Mission Critical Services (MCX) specs to exchange the SSRC value between client and server in case of implicit floor request method.

Therefore, it is required to address such concerns and to provide one more method implemented in a system to exchange the SSRC value between the client and the server for implicit floor requests.

SUMMARY

Embodiments of the disclosure provide a method and apparatus for communicating efficiently between a client and a server in a communication system supporting the MCPTT.

According to an example embodiment, the disclosure provides a method to exchange an SSRC value between client and server for implicit floor requests in accordance with Mission Critical Push-To-Talk (MCPTT) Multi-Talker call. The method comprises: sharing by the client, a synchronization source (SSRC) value as Format Specific Parameter (FMTP) media attribute of a session description protocol (SDP) in an outgoing INVITE request to the server, wherein the same SSRC value formatted in accordance with a 200 OK response is received by the client from the server based on the SSRC value not being in use; and a new SSRC value formatted in accordance with the 200 OK response is received by the client from the server based on the SSRC value being in use.

According to an example embodiment, the disclosure provides a method to identify a client among a plurality of clients during an MCPTT call. The method comprises: receiving, by at least one client, from a server a floor taken message associated with each of the plurality of clients comprising an SSRC value formatted in accordance with 200 OK response; receiving, by the at least one client, a plurality of Real-Time Transport Protocol (RTP) streams from the plurality of clients with the SSRC value associated with each of the plurality of clients; and identifying, by the at least one client, each client among the plurality of clients based on the SSRC value received in the floor taken message associated with each of the plurality of clients and the SSRC value received with the plurality of RTP streams.

According to various example embodiments of the disclosure, a method and apparatus to exchange an SSRC value between a client and a server for implicit floor requests are provided. In an embodiment, the exchange of the SSRC value between the client and the server for implicit floor requests is being done with Explicit Grant Support during a Multi-Talker MCPTT call where the SSRC sharing in FMTP media attribute of Session Description Protocol (SDP). In an embodiment, the exchange of the SSRC value between the client and the server for implicit floor requests is being done with Implicit Grant Support during a Multi-Talker MCPTT call where the SSRC sharing in FMTP media attribute of SDP. In an embodiment, the exchange of the SSRC value between the client and the server for implicit floor requests is being done with Implicit/Explicit Grant Support during a Multi-Talker MCPTT call where the SSRC sharing in SSRC and FMTP media attribute of SDP.

According to an example embodiment of the present disclosure, a method performed by a server in a communication system supporting mission critical push-to-talk (MCPTT) is provided, the method comprises: sharing a synchronization source (SSRC) value as format specific parameter (FMTP) media attribute of a session description protocol (SDP) in an outgoing INVITE request from a client, transmitting, to the client, the same SSRC value formatted in accordance with a 200 OK response if the SSRC value is not in use, and transmitting, to the client, a new SSRC value formatted in accordance with 200 OK response if the SSRC value is in use.

According to an example embodiment of the present disclosure, a server device in a communication system supporting mission critical push-to-talk (MCPTT) is provided, the server device comprises: a transceiver, and a processor configured to: share a synchronization source (SSRC) value as format specific parameter (FMTP) media attribute of a session description protocol (SDP) in an outgoing INVITE request from a client, control the transceiver to transmit, to the client, the same SSRC value formatted in accordance with a 200 OK response if the SSRC value is not in use, and control the transceiver to transmit, to the client, a new SSRC value formatted in accordance with the 200 OK response if the SSRC value is in use.

Further, the methods disclosed herein can be implemented in any MCPTT supported system which includes but not limited to Mobile device, soft clients etc.

Further, the methods disclosed herein can be used for other MCX services such as MCVideo, MCData and not limited to MCPTT.

To further clarify the advantages and features of the present disclosure, a more particular description of the disclosure will be rendered with reference to various example embodiments thereof, which are illustrated in the appended drawings. It is appreciated that these drawings depict example embodiments of the disclosure and are therefore not to be considered limiting of its scope. The disclosure will be described and explained with additional specificity and detail with the accompanying drawings.

BRIEF DESCRIPTION OF THE DRAWINGS

The above and other features, aspects, and advantages of certain embodiments of the present disclosure will be more apparent from the following detailed description, taken in conjunction with the accompanying drawings in which.

Figure 1A:
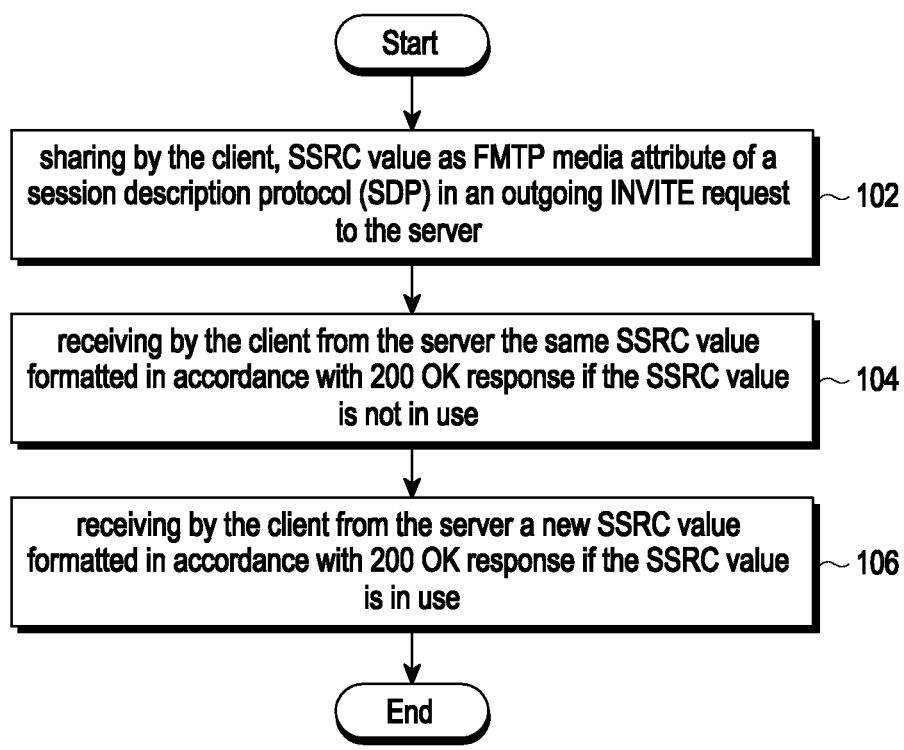
FIG. 1A is a flowchart illustrating an example method for exchanging an SSRC value between client and server for implicit floor requests in accordance with Mission Critical Push-To-Talk (MCPTT) Multi-Talker call according to various embodiments.

Further, skilled artisans will appreciate that elements in the drawings are illustrated for simplicity and may not have been necessarily been drawn to scale. For example, the flowcharts illustrate the method in terms of operations involved to improve understanding of aspects of the present disclosure. Furthermore, in terms of the construction of the device, one or more components of the device may have been represented in the drawings by conventional symbols, and the drawings may show those specific details for understanding the present disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to various example embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated will be apparent to one skilled in the art to which the disclosure relates.

It will be understood by those skilled in the art that the foregoing general description and the following detailed description are explanatory of the disclosure and are not intended to be restrictive thereof.

The term "couple" and its derivatives may refer, for example, to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may refer, for example to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" may include various circuitry and refer, for example, to any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, may refer, for example, to different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" may refer, for example, to one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium may not include wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Reference throughout this disclosure to "an aspect", "another aspect" or similar language may refer, for example, to a particular feature, structure, or characteristic described in connection with the embodiment being included in an embodiment of the present disclosure. Thus, appearances of the phrase "in an embodiment", "in another embodiment" and similar language throughout this disclosure may, but do not necessarily, all refer to the same embodiments.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . " A does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

According to the present disclosure, systems and methods are disclosed to exchange the SSRC value between a client and a server for implicit floor requests with at least one of implicit grant support, explicit grant support or implicit/explicit grant support during a Multi-Talker MCPTT call. The methods of the disclosure are not limited to the MCPTT service and can be used for other MCX services such as MCVideo, MCData, etc.

According to an embodiment of the present disclosure, new SDP FMTP attribute "mc_ssrc" is created for sending SSRC values.

FIG. 1A is a flowchart illustrating an example method for exchanging an SSRC value between client and server for implicit floor requests in accordance with Mission Critical Push-To-Talk (MCPTT) Multi-Talker call according to various embodiments.

The method comprises sharing (operation 102) by the client, SSRC value as FMTP media attribute of a session description protocol (SDP) in an outgoing INVITE request to the server. The sharing by client the SSRC value comprises sharing the SSRC value by adding it to the "mc_ssrc" FMTP attribute of the application m-line of SDP offer for the outgoing INVITE request.

In an example, the sending and receiving the SSRC value may include an exchange of the SSRC value between the client and the server for implicit floor requests with Explicit Grant Support during a Multi-Talker MCPTT call where the SSRC is shared in FMTP media attribute of the Session Description Protocol (SDP).

In another example, the sharing by the client the SSRC value comprises performing the SSRC sharing as an FMTP attribute of SDP, either in application m-line or media m-line.

The method comprises receiving (operation 104) by the client from the server the same SSRC value formatted in accordance with 200 OK response if the SSRC value is not in use. The receiving from the server the SSRC value comprises receiving from the server the same SSRC value included in the "mc_ssrc" fmtp attribute of the application m-line in SDP answer of the 200 OK response for INVITE.

The method further comprises receiving (operation 106) by the client from the server a new SSRC value formatted in accordance with 200 OK response if the SSRC value is in use. The receiving from the server the new SSRC value comprises receiving from the server the new SSRC value in an explicit Floor GRANT message.

In another example, the receiving from the server the new SSRC value comprises receiving from the server the new SSRC value included in the "mc_ssrc" fmtp attribute of the application m-line in SDP answer of the 200 OK response for INVITE.

In another example, the receiving from the server the new SSRC value comprises receiving an Implicit/Explicit Grant Support during the Multi-Talker MCPTT call where the SSRC sharing is performed via FMTP attribute of application m-line in SDP.

Figure 1B:
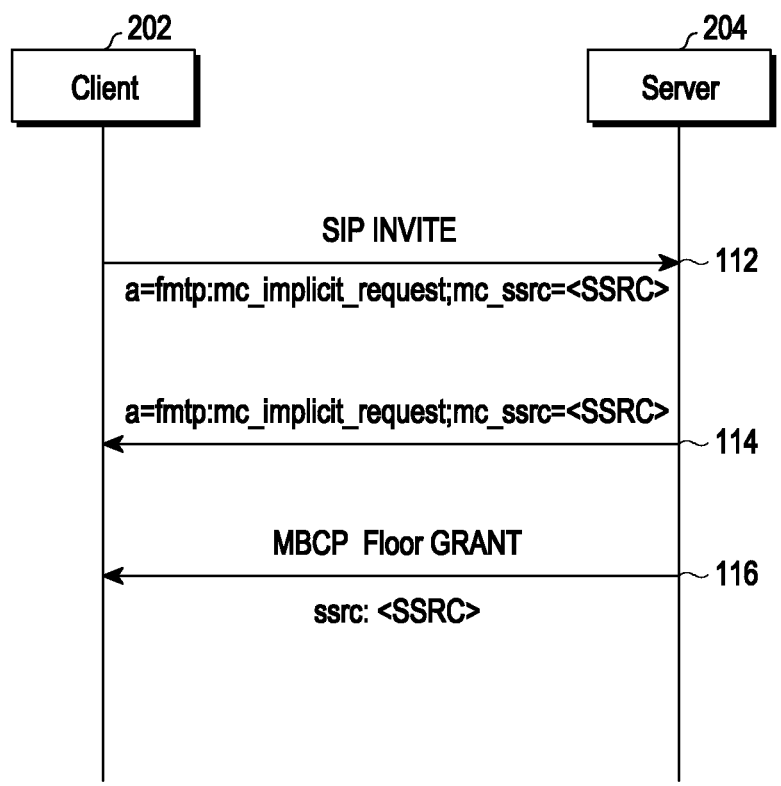
FIG. 1B is a call flow diagram illustrating an example exchange SSRC value for implicit floor requests with explicit grant support during Multi-talker MCPTT calls, according to various embodiments.

FIG. 1B is a call flow diagram corresponding to operations 102 to 106 of an example method for exchanging SSRC value for implicit floor requests with explicit grant support during Multi-talker MCPTT calls, according to various embodiments. The method may be implemented in devices such as Mobile, soft clients, etc. that supports MCPTT. According to the embodiment, the SSRC is shared in the FMTP media attribute of SDP. Referring to FIG. 1B, in operation 112, the client (202) shares the SSRC value by adding it to the "mc_ssrc" fmtp attribute of the application m-line of SDP offer for Outgoing INVITE request.

In an example, in operation 114, if this SSRC value is NOT in use, the server (204) sends the same SSRC value to client (202). The server (204) sends said same SSRC value by including said value to the "mc_ssrc" fmtp attribute of the application m-line in SDP answer of 200 OK response for INVITE. The same can be illustrated by way of non-limiting example as:

Offer:
m=application 1234 udp MCPTT
a=fmtp: MCPTT mc_priority=5; mc_implicit_request; mc_ssrc=11111
Answer:
m=application 1234 udp MCPTT
a=fmtp:MCPTT mc_priority=5; mc_implicit_request; mc_ssrc=11111

In another example, in operation 114, if the SSRC value is already in use, the server (204) generates a new SSRC. The server 204 shares the new SSRC to the client 202 in 200 OK response. Said embodiment ensures uniqueness of SSRC usage across multiple transmitting clients in a group call. In operation 116, the server 204 can send the SSRC in the explicit Floor GRANT message to the client 202. The same can be illustrated by way of non-limiting example as:

Offer:
m=application 1234 udp MCPTT
a=fmtp: MCPTT mc_priority=5; mc_implicit_request; mc_ssrc=11111
Answer:
m=application 1234 udp MCPTT
a=fmtp:MCPTT mc_priority=5; mc_implicit_request; mc_ssrc=22222

Figure 2:
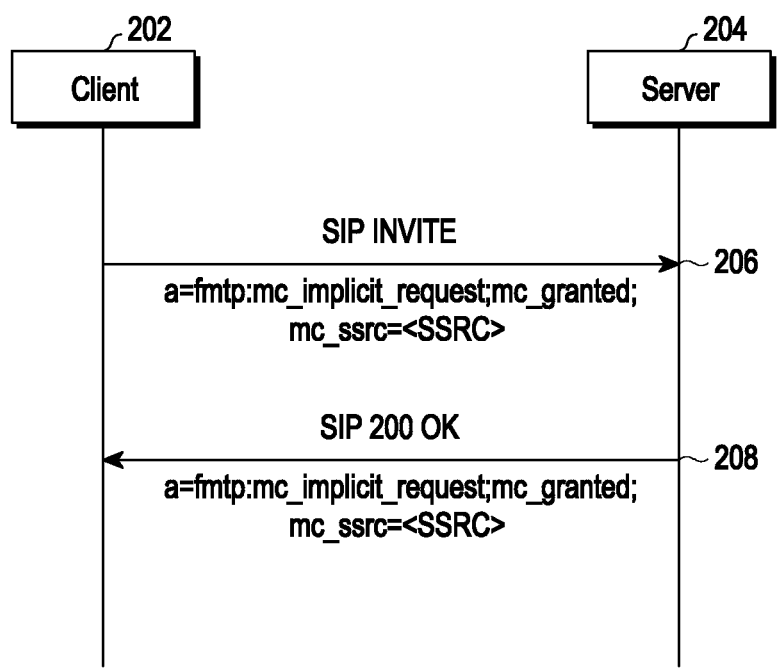
FIG. 2 is a call flow diagram illustrating an example exchange SSRC value for implicit floor requests with implicit grant support during Multi-talker MCPTT calls, according to various embodiments.

FIG. 2 is a call flow diagram corresponding to operations 102 to 106 illustrating example operations to exchange SSRC value for implicit floor requests with implicit grant support during Multi-talker MCPTT calls, according to various embodiments. The method may be implemented in devices such as Mobile, soft clients, etc. that supports MCPTT. According to the embodiment, the SSRC is shared in the fmtp media attribute of SDP. Referring to FIG. 2, in operation 206, the client 202 shares the SSRC value by adding it to the "mc_ssrc" fmtp attribute of the application m-line of SDP offer for Outgoing INVITE request.

In an example, in operation 208, if the SSRC value is NOT in use, the server 204 sends the same SSRC value to the client 202 by including it to the "mc_ssrc" fmtp attribute of the application m-line in SDP answer of 200 OK response for INVITE. The same can be illustrated by way of non-limiting example as:
Offer:
m=application 1234 udp MCPTT
a=fmtp:MCPTTmc_priority=5;mc_implicit_request;
   mc_granted;
mc_ssrc=11111
Answer:
m=application 1234 udp MCPTT
a=fmtp:MCPTTmc_priority=5;mc_implicit_request;
   mc_granted;
mc_ssrc=11111

In another example, in operation 208, if the SSRC value is already in use, the server 204 generates a new SSRC and share it to the client 202 in 200 OK response. This ensures uniqueness of SSRC usage across multiple transmitting clients in a group call. The same can be illustrated by way of non-limiting example as:
Offer:
m=application 1234 udp MCPTT
a=fmtp:MCPTTmc_priority=5;mc_implicit_request;
   mc_granted; mc_ssrc=11111
Answer:
m=application 1234 udp MCPTT
a=fmtp:MCPTTmc_priority=5;mc_implicit_request;
   mc_granted; mc_ssrc=22222

Figure 3:
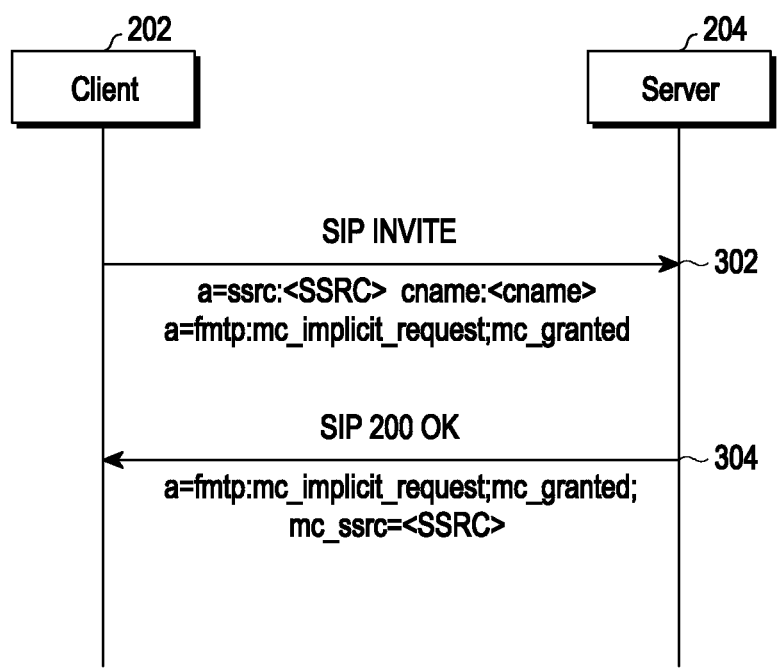
FIG. 3 is a call flow diagram illustrating an example exchange SSRC value for implicit floor requests with implicit/explicit grant support during Multi-talker MCPTT calls, according to various embodiments.

FIG. 3 is a call flow diagram corresponding to operations 102 to 106 illustrating example operations to exchange SSRC value for implicit floor requests with implicit/explicit grant support during Multi-talker MCPTT calls, according to various embodiments. The method may be implemented in devices such as Mobile, soft clients, etc. that supports MCPTT. According to the embodiment, the SSRC is shared in ssrc and fmtp media attribute of SDP. Referring to FIG. 3, in operation 302, the client 202 shares the SSRC value by adding it as an attribute to the media m-line of SDP offer for Outgoing INVITE request.

In an example, in operation 304, if this SSRC value is NOT in use, the server 204 sends the same SSRC value to the client 202 by including it to the "mc_ssrc" fmtp attribute of the application m-line in SDP answer of 200 OK response for INVITE. The same can be illustrated by way of non-limiting example as:
Offer:
m=audio 14000 RTP/AVP 105
a=ssrc:11111 cname: MCPTTUser@example.com
m=application 1234 udp MCPTT
a=fmtp:MCPTT   mc_priority=5;mcgranted;mc_implicit_request
Answer:
m=audio 14000 RTP/AVP 105
a=ssrc:xxxxx cname:MCPTTServer@example.com
m=application 1234 udp MCPTT
a=fmtp:MCPTT   mc_priority=5;mcgranted;mc_implicit_request;mc_ssrc=11111

In another example, in operation 304, if the SSRC value is already in use, the server 204 generates a new SSRC. The server 204 shares it to client in 200 OK response. The same can be illustrated by way of non-limiting example as:
Offer:
m=audio 14000 RTP/AVP 105
a=ssrc:11111 cname: MCPTTUser@example.com
m=application 1234 udp MCPTT
a=fmtp:MCPTT   mc_priority=5;mcgranted;mc_implicit_request
Answer:
m=audio 14000 RTP/AVP 105
a=ssrc:xxxxx cname:MCPTTServer@example.com
m=application 1234 udp MCPTT
a=fmtp:MCPTT   mc_priority=5;mc_granted;mc_implicit_request;mc_ssrc=22222

Thus, the embodiments of the present disclosure provide uniqueness of SSRC usage across multiple transmitting clients in a group call.

Figure 4:
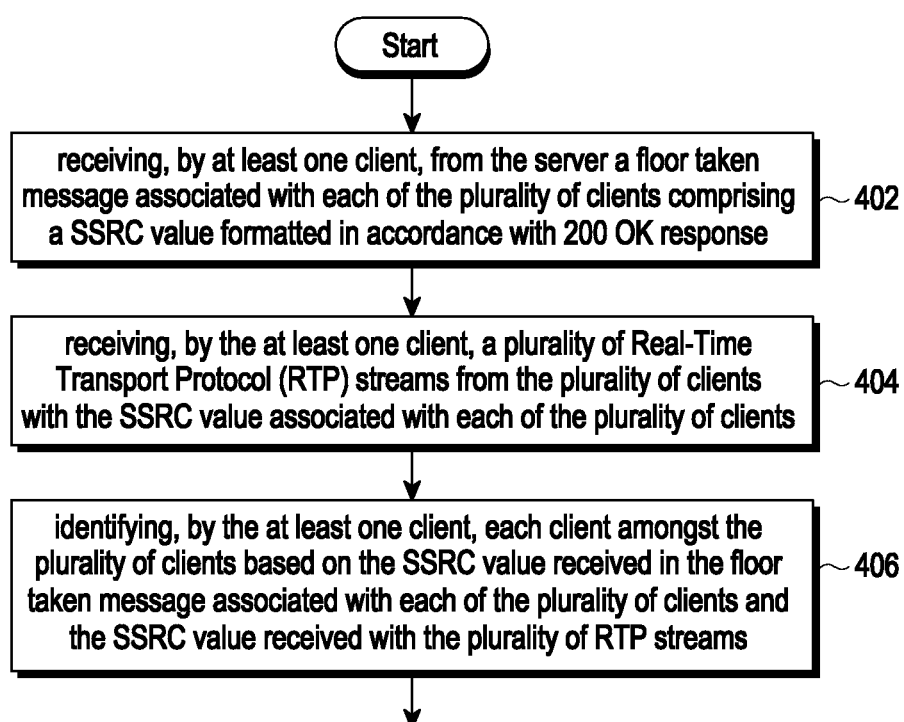
FIG. 4 is a flowchart illustrating an example method for identifying a client among a plurality of clients during a MCPTT call, according to various embodiments.

FIG. 4 is a flowchart illustrating an example method to identify a client among a plurality of clients during a MCPTT call, according to various embodiments.

In an embodiment, the method includes receiving (operation 402), by at least one client, from the server a floor taken message associated with each of the plurality of clients comprising a SSRC value formatted in accordance with 200 OK response. In an embodiment, the server transmits the floor taken message associated with each of the plurality of clients in response to receiving an outgoing INVITE request comprising SSRC value as FMTP media attribute of a session description protocol (SDP) from each of the plurality of clients. Further, the server may be configured to sharing in response to receiving each of the outgoing INVITE requests, the SSRC value formatted in accordance with 200 OK response in a floor grant message with the plurality of clients.

In an embodiment, the method includes receiving (operation 404), by the at least one client, a plurality of Real-Time Transport Protocol (RTP) streams from the plurality of clients with the SSRC value associated with each of the plurality of clients.

In an embodiment, the method includes identifying (operation 406), by the at least one client, each client among the plurality of clients based on the SSRC value received in the floor taken message associated with each of the plurality of clients and the SSRC value received with the plurality of RTP streams.

Figure 5:
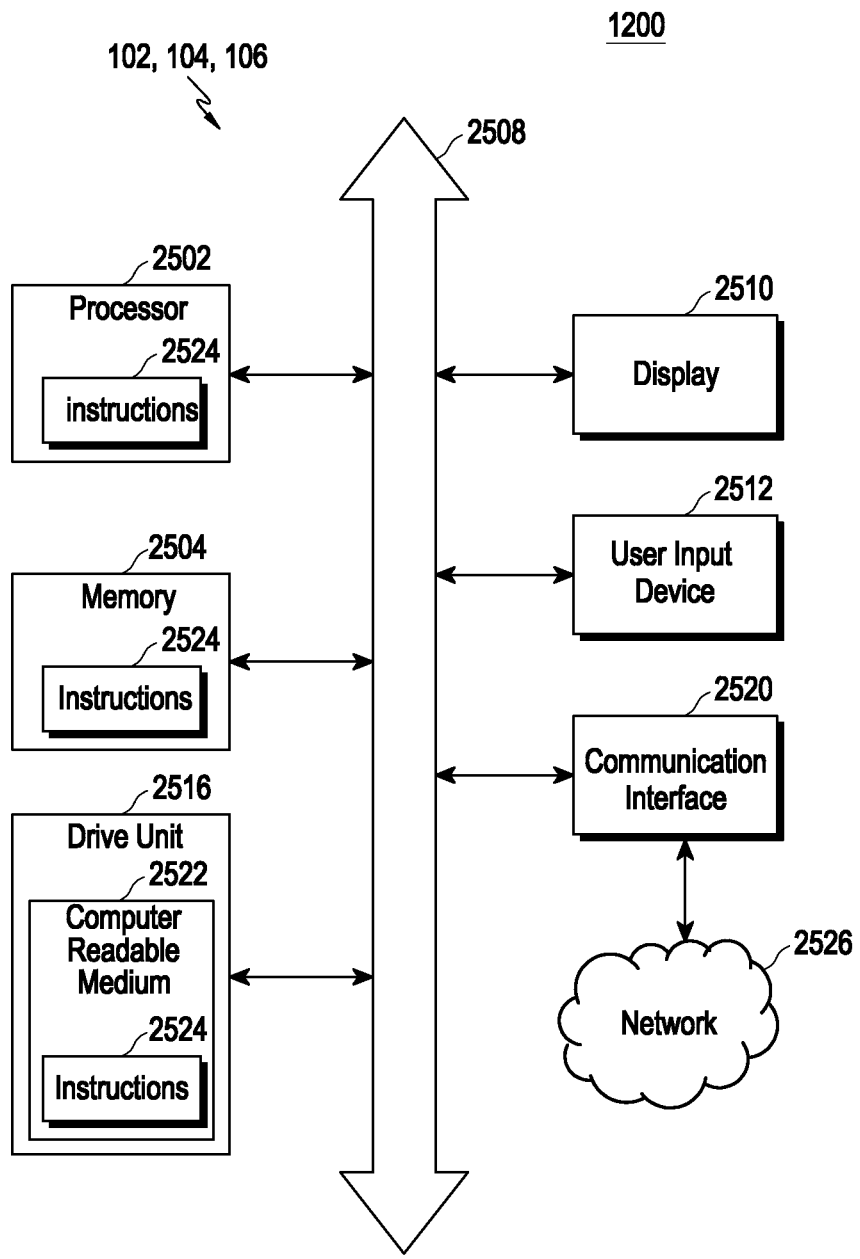
FIG. 5 is a diagram illustrating an example configuration of a computing device based implementation of the operations illustrated in FIGS. 1A and 1B, according to various embodiments.

FIG. 5 is a diagram illustrating an example configuration of a computing device 1200 based implementation of the operations illustrated in FIGS. 1A and 1B, according to various embodiments. The computer device 1200 can include a set of instructions that can be executed to cause the computer device 1200 to perform any one or more of the methods disclosed. The computer device 1200 may operate as a standalone device or may be connected, e.g., using a network, to other computer devices or peripheral devices. The client 202 and the server 204 may be also implemented with a processor and a transceiver.

In a networked deployment, the computer device 1200 may operate as the server (device) 204 or as a client (device) 202 in a server-client user network environment, or as a peer computer device in a peer-to-peer (or distributed) network environment. The computer device 1200 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer device 1200 is illustrated, the term "device" shall also be taken to include any collection of devices or sub-devices that individually or jointly execute a set, or multiple sets, of instructions to perform one or more computer functions.

The computer device 1200 may include a processor (e.g., including processing circuitry) 2502 e.g., a central processing unit (CPU), a graphics processing unit (GPU), or both. The processor 2502 may be a component in a variety of devices. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (e.g., programmed).

The computer device 1200 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the device memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer device 1200 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer device 1200 may include an input device 2512 configured to allow a user to interact with any of the components of device 1200. The computer device 1200 may also include a disk or optical drive unit 2516. The disk drive unit 2516 may include a computer-readable medium 2522 in which one or more sets of instructions 2524, e.g. software, can be embedded. Further, the instructions 2524 may embody one or more of the methods or logic as described. In a particular example, the instructions 2524 may reside completely, or at least partially, within the memory 2504 or within the processor 2502 during execution by the computer device 1200.

The present disclosure contemplates a computer-readable medium 2522 that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication interface 2520 may be also the transceiver that refers to a receiver and a transmitter. The communication port or interface 2520 may be a part of the processor 2502 or maybe a separate component. The communication port 2520 may be created in software or maybe a physical connection in hardware. The communication port 2520 may be configured to connect with a network 2526, external media, the display 2510, or any other components in device 1200, or combinations thereof. The connection with the network 2526 may be a physical connection, such as a wired Ethernet connection or may be established wirelessly as discussed later. Likewise, the additional connections with other components of the device 1200 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The device is not limited to operation with any particular standards and protocols. For example, standards for Internet and other packet-switched network transmissions (e.g., TCP/IP, UDP/IP, HTML, and HTTP) may be used.

While specific language has been used to describe the present disclosure, any limitations arising on account thereto, are not intended. As would be apparent to a person in the art, various working modifications may be made to the method in order to implement the disclosure as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a client device in a communication system supporting mission critical push-to-talk (MCPTT), the method comprising:
   transmitting, to a server, an session description protocol (SDP) offer including a synchronization source (SSRC) value as a media attribute of a session description protocol (SDP); and
   receiving, from the server, an SDP answer in response to the SDP offer,
   wherein the SDP answer includes either a same SSRC value in response to the SSRC value in the SDP offer not being in use or a new SSRC value in response to the SSRC value in the SDP offer being in use.

2. The method of claim 1, wherein the client device transmits a session initiation protocol (SIP) INIVITE request including the SDP offer, and receives a SIP 200 OK response including the SDP answer in response to transmission of the SIP INIVITE request.

3. The method of claim 1, wherein transmitting, to a server, an SDP offer including an SSRC value comprises transmitting, to the server, the SDP offer including the SSRC value as the media attribute of an application m-line of the SDP offer.

4. The method of claim 1, wherein receiving, from the server, the SDP answer comprises receiving, from the server, the SDP answer including either the same SSRC value or the new SSRC as the media attribute of an application m-line in the SDP answer.

5. The method of claim 2, wherein the SIP INIVITE request including the SSRC value in the SDP order corresponds to an implicit floor request.

6. The method of claim 2, wherein receiving, from the server, an SDP answer comprises:
   receiving, from the server, the new SSRC value included in the media attribute of an application m-line in the SDP answer of the SIP 200 OK response.

7. The method of claim 1, wherein transmitting, to a server, an SDP offer including an SSRC value comprises transmitting, to the server, the SSRC value as the media attribute in either an application m-line or a media m-line of the SDP offer.

8. The method of claim 5, wherein the same SSRC value or the new SSRC included in the SDP answer corresponds to a grant for the implicit floor request.

9. A method performed by a server in a communication system supporting mission critical push-to-talk (MCPTT), the method comprising:
   receiving, from a client device, an session description protocol (SDP) offer including a synchronization source (SSRC) value as a media attribute of a session description protocol (SDP);
   transmitting, to the client device, an SDP answer including a same SSRC value in case that the SSRC value in the SDP offer is not in use; and
   transmitting, to the client device, an SDP answer including a new SSRC value in case that the SSRC value in the SDP offer is in use.

10. The method of claim 9, wherein the server receives a session initiation protocol (SIP) INIVITE request including the SDP offer, and transmits a SIP 200 OK response including the SDP answer in response to reception of the SIP INIVITE request.

11. The method of claim 9, wherein receiving, from a client device, an SDP offer including an SSRC value comprises receiving, from the client device, the SDP offer including the SSRC value as the media attribute of an application m-line of the SDP offer.

12. The method of claim 9, wherein transmitting, to the client device, the SDP answer comprises transmitting, to the client device, the SDP answer including either the same SSRC value or the new SSRC as the media attribute of an application m-line in the SDP answer.

13. The method of claim 10, wherein the SIP INIVITE request including the SSRC value in the SDP order corresponds to an implicit floor request.

14. The method of claim 10, wherein transmitting, to the client device, an SDP answer comprises:
   transmitting, to the client device, the new SSRC value included in the media attribute of an application m-line in the SDP answer of the SIP 200 OK response.

15. The method of claim 9, wherein receiving, from a client device, an SDP offer including an SSRC value comprises receiving, from the client device, the SSRC value as the media attribute in either an application m-line or a media m-line of the SDP offer.

16. The method of claim 13, wherein the same SSRC value or the new SSRC included in the SDP answer corresponds to a grant for the implicit floor request.

17. A client device in a communication system supporting mission critical push-to-talk (MCPTT), the client device comprising:
   a transceiver; and
   a processor configured to:
      control the transceiver to transmit, to a server via the transceiver, an session description protocol (SDP) offer including a synchronization source (SSRC) value as a media attribute of a session description protocol (SDP), and
      receive, from the server via the transceiver, an SDP answer in response to the SDP offer,
   wherein the SDP answer includes either a same SSRC value in response to the SSRC value in the SDP offer not being in use or a new SSRC value in response to the SSRC value in the SDP offer being in use.

18. The client device of claim 17, wherein the processor is configured to: control the transceiver to transmit, to the server, a session initiation protocol (SIP) INIVITE request including the SDP offer, and receive, from the server via the transceiver, a SIP 200 OK response including the SDP answer in response to transmission of the SIP INIVITE request.

19. A server in a communication system supporting mission critical push-to-talk (MCPTT), the server comprising:
   a transceiver; and
   a processor configured to:
      receive, from a client device via the transceiver, an session description protocol (SDP) offer including a synchronization source (SSRC) value as a media attribute of a session description protocol (SDP),
      control the transceiver to transmit, to the client device, an SDP answer including a same SSRC value in case that the SSRC value in the SDP offer is not in use, and
      control the transceiver to transmit, to the client device, an SDP answer including a new SSRC value in case that the SSRC value in the SDP offer is in use.

20. The server of claim 19, wherein the processor is configured to receive, from the client device via the transceiver, a session initiation protocol (SIP) INIVITE request including the SDP offer, and control the transceiver to transmit, to the client device, a SIP 200 OK response including the SDP answer in response to reception of the SIP INIVITE request.

\* \* \* \* \*